United States Patent Office 3,326,725
Patented June 20, 1967

3,326,725
CATALYST ELECTRODE INSENSITIVE TO OXIDATION FOR ELECTROCHEMICAL PROCESSES
Egbert Guth, Neuenhof, and Heinz-Günther Plust, Spreitenbach, Switzerland, assignors to Aktiengesellschaft Brown, Boveri & Cie, Baden, Switzerland, a joint-stock company
No Drawing. Filed Dec. 6, 1963, Ser. No. 328,523
Claims priority, application Switzerland, Dec. 12, 1962, 14,580/62
3 Claims. (Cl. 136—120)

Electrodes based on Raney nickel have proved to be particularly satisfactory as electrodes for the conversion of the hydrogen in electrochemical fuel cells of the $H_2/O_2$ type with aqueous electrolytes. Such electrodes are known or have been proposed in the form of double-skeleton catalyst electrodes and as mono-skeleton catalyst electrodes.

Double-skeleton electrodes consist of an electrically conducting skeleton in which are embedded grains of Raney metal. In order to produce them, the Raney nickel is first prepared and then ground into a fine powder. The appropriate range of grain sizes is selected from this Raney nickel powder by air separation or screening and is then mixed with a powder of catalytically inactive nickel and the mixture is pressed and sintered in a reducing atmosphere at 600 to 1000° C.

In mono-skeleton electrodes, the whole inner surface of the porous electrode body consists of Raney nickel. For their production, nickel and aluminium powders of suitable grain sizes are mixed, particularly under mechanical pressure, the mixture is pressed into a moulded body and sintered.

The catalytic activity of such electrodes is caused by the strongly disordered nickel which is obtained from the mixed crystals of the Raney alloy by a special activation process. As a result of dissolving the aluminium out of the Raney alloy by means of alkaline solutions and as a result of the so-called controlled activation, a disorder of the nickel lattice is caused which in turn leads to a large number of so-called active centers at the inner surfaces of the porous electrode body. Because of the favorable energy relations at these centers, interactions with partners in adjacent phases are very easily possible. This applies with regard to the chemisorption and ionization of the hydrogen which can pass reversibly from the active centers into the disturbed part of the nickel lattice and remain dissolved there. Catalyst electrodes based on Raney nickel therefore have a very low polarization potential even when they are continuously loaded with high current densities, for example 100 ma./cm.$^2$, which is an advantage. In addition, the electrodes permit hydrogen to be stored in a quantity of up to about 1.3 hydrogen atoms per atom of Raney nickel. The said two favorable properties are of decisive importance for the use of the electrodes in the electrochemical fuel cell and in accumulators. To this must be added the fact that the raw materials are relatively cheap and the methods of production are simple, particularly for the mono-skeleton electrodes.

Known disadvantages of the catalyst electrodes based on a Raney nickel lie in the fact that their storage capacity for hydrogen drops after repeated overloading and that they deteriorate in an irreversible manner with regard to the storage capacity and the polarisation if they assume too great a positive potential of for example more than +100 mv. in relation to a saturated calomel electrode or if they are swept with oxygen. These disadvantageous phenomena result from the fact that not only is the chemisorption and ionization of the hydrogen facilitated at the active centers because of the favorable energy conditions but also the oxygen which, however, then leads irreversibly to the formation of nickel oxide and hence to the annihilation of the active centers.

It is true that catalyst electrodes are known which do not display an irreversible deterioration as a result of oxygen. In these electrodes, a nickel or carbon structure is coated with a layer of platinum or palladium or a silver-palladium alloy or an alloy of precious metal and nickel is used as active material. Apart from resistance to sweeping with oxygen, the electrodes have a very low polarisation but because of the expensive previous metals needed in considerable quantities they are unsuitable for large-scale technical applications and in addition have the decisive disadvantage that they have practically no storage capacity for hydrogen. This disadvantage has a detrimental effect on the overload capacity when the electrodes are used in fuel cells and naturally excludes the use of the electrodes in accumulators.

It is the object of the present invention to overcome the said disadvantages and to provide a catalyst electrode which has favorable electrochemical and absorption characteristics, and which does not deteriorate as a result of sweeping with oxygen or oxygen precipitation.

The catalyst electrode based on Raney nickel, which is insensitive to oxidation, for the conversion of hydrogen in electrochemical processes is characterized in that the active centers of a porous electrode body comprising inner surfaces of activated Raney nickel and known per se, are covered with a thin layer of a metal of the platinum group.

As a result of the covering of the active centers, which have a catalytic influence on the hydrogen splitting, with a thin layer of a metal of the platinum group, the effect is obtained that the oxygen can no longer reach the active centers and annihilate these through oxidation. The partially covered surface nevertheless remains active for the electrochemical conversion because the metal of the platinum group used for the covering is catalytically active. In addition, the hydrogen can diffuse through the thin layer of metal to the subjacent active centers of the nickel surfaces and can be stored reversibly in the nickel lattice through these centers. In the catalyst electrode according to the invention, therefore, the favorable properties of an electrode based on Raney nickel are retained substantially in full whereas the disadvantageous effects of the influence of oxygen are avoided.

With reference to measurements of the potentials at mono-skeleton electrodes in relation to a saturated calomel electrode it was found that the electrode potential dropped by 140 mv. in electrodes with covered active centers of −1130 mv. as a result of an increase in the load from the unloaded condition to 300 ma./cm.$^2$ compared with 230 mv. in electrodes with uncovered centers. After a potential of reversed polarity of more than +300 mv. had been imposed on the electrodes for 30 minutes, the electrodes with covered active centers showed a drop in potential by 110 mv. for the same increase in load whereas in the electrodes with uncovered active centers the potential broke down under load. With regard to the storage capacity for hydrogen, the electrodes with covered active centers had a capacity of about 100 ah./kg. electrode material before the imposition of a positive potential and a capacity of about 90 ah./kg. electrode material after the imposition of a potential of more than +300 mv. In the electrodes with uncovered active centers, on the other hand, no more storage capacity for hydrogen at all could be found after the imposition of a positive potential.

A suitable method of producing a catalyst electrode according to the invention comprises on the one hand the known steps of powdering Raney nickel, mixing with nickel powder, pressing to form an electrode body and subsequent sintering to form a double-skeleton electrode.

In the case of a mono-skelton electrode, the corresponding steps are the mixing of nickel and aluminium powder which is preferably effected under mechanical pressure, the pressing to form an electrode body and subsequent sintering which is preferably preceded by tempering of the pressed body. Then the electrode body is activated, likewise in known manner, by treating the body with leach in order to dissolve out the inactive aluminium component. In order to cover the active centers formed by the activation, the electrode body is then treated with an aqueous or alcoholic solution of a salt of the platinum group, that is to say, a salt of one of the metals platinum, ruthenium, rhodium palladium, rhenium osmium and iridium.

In a preferred method, an electrode body is first produced in known manner by powdering, mixing, pressing and sintering nickel and aluminium and is then activated by a treatment in aqueous alkali. Then the electrode body is treated for 5 to 50 hours in a 5% methanol solution of hexachloroplatinic acid ($H_2PtCl_6$) and is finally rinsed with distilled water.

The method described of applying platinum is particularly appropriate. It is based on a charge transfer process at the nickel surface in accordance with the reactions

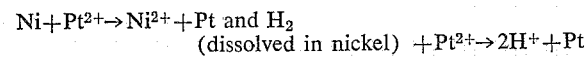

$Ni + Pt^{2+} \rightarrow Ni^{2+} + Pt$ and $H_2$ (dissolved in nickel) $+ Pt^{2+} \rightarrow 2H^+ + Pt$ Because of the favorable energy condition of the nickel at the active centers, the charge transfer takes place by preference at these points and also remains substantially restricted to these points. The amount of platinum needed for the covering of the active centers against the action of oxygen according to the invention is therefore very small and amounts to less than 1 gram of platinum per kilogram of electrode material. This amount of platinum is therefore not important as regards cost.

The other metals of the platinum group can be used in the same manner and the electrode body may, for example, be treated, after the activation, with a 5% methanol solution of $PdCl_2 \cdot 2H_2O$.

The catalyst electrode according to the invention is suitable not only for use in electrochemical fuel cells with gaseous fuels or fuels dissolved in the electrolyte but may also be used to advantage as an electrode in electrolysis cells or in alkali accumulators. In this case, the necessity of a diaphragm in the electrolyte to separate the gas, that is to say to keep the oxygen away from the hydrogen electrode, is avoided. There is a further advantage when a plurality of cells are connected in series, namely when for any reason a reversal of the polarity occurs in a cell as a result of deterioration of the current-voltage characteristic of the hydrogen and oxygen electrodes. As a result of the development of oxygen at the hydrogen electrode, this is destroyed if the active centers are not covered at their inner surfaces.

We claim:
1. A method of producing a catalyst electrode which comprises mixing nickel powder with aluminium powder, pressing the mixture to form a porous electrode body, sintering said formed electrode body whereby zones of inter-metallic nickel-aluminium alloy are formed adjacent to the pore surfaces within the electrode, treating the electrode body with leach in order to dissolve out the aluminium from said alloy zones thereby producing active centers at the places where the aluminium is leached out from said alloy zones, and treating the resulting electrode body with a solution of a salt of a metal of the platinum group in a solvent consisting of a material selected from the group consisting of water and alcohol at a concentration and for a time sufficient to deposit a thin layer of said metal of the platinum group amounting to less than 1 gram per kilogram of electrode material at said active centers.

2. A method of producing a catalyst electrode which comprises powdering Ranel nickel aluminum alloy, mixing the Raney nickel aluminum alloy powder with nickel powder, pressing the mixture to form a porous electrode body, sintering said formed electrode body, treating the electrode body with leach in order to dissolve out the aluminum component of the Raney nickel aluminum alloy adjacent to the pore surfaces of the electrode thereby producing active centers at the places where said aluminum is leached out, and treating the resulting electrode body with a solution of a salt of a metal of the platinum group in a solvent consisting of a material selected from the group consisting of water and alcohol at a concentration and for a time sufficient to deposit a thin layer of said metal of the platinum group amounting to less than 1 gram per kilogram of electrode material at said active centers.

3. A method as claimed in claim 1 in which said solution is a 5% methanol solution of hexachloroplatinic acid.

References Cited
UNITED STATES PATENTS

| | | | |
|---|---|---|---|
| 3,110,622 | 11/1963 | Hipp | 136—120 |
| 3,147,154 | 9/1964 | Cole et al. | 117—130 |
| 3,201,282 | 8/1965 | Justi et al. | 136—86 |

WINSTON A. DOUGLAS, *Primary Examiner.*

N. P. BULLOCH, *Assistant Examiner.*